United States Patent
Cruikshank (10) Patent No.: US 6,829,315 B1
(45) Date of Patent: Dec. 7, 2004

(54) ALIGNMENT OF PARALLEL DATA CHANNELS USING HEADER DETECTION SIGNALING

(75) Inventor: Brian S. Cruikshank, Boulder, CO (US)

(73) Assignee: Mindspeed Technologies, Inc., Newport Beach, CA (US)

(*) Notice: Subject to any disclaimer, the term of this patent is extended or adjusted under 35 U.S.C. 154(b) by 0 days.

(21) Appl. No.: 09/487,139

(22) Filed: Jan. 19, 2000

(51) Int. Cl.$^7$ ............................. H04L 7/00; H04J 3/06
(52) U.S. Cl. ................... 375/354; 375/364; 375/371; 370/503; 370/506; 341/50; 341/102
(58) Field of Search ...................... 375/354–375; 341/50, 102, 103

(56) References Cited

U.S. PATENT DOCUMENTS

| | | | |
|---|---|---|---|
| 4,486,739 A | | 12/1984 | Franaszek et al. |
| 4,701,913 A | * | 10/1987 | Nelson ..................... 370/522 |
| 4,967,405 A | | 10/1990 | Upp et al. |
| 5,025,458 A | * | 6/1991 | Casper et al. ............. 375/365 |
| 5,113,395 A | * | 5/1992 | Murakami et al. ......... 370/505 |
| 5,408,473 A | * | 4/1995 | Hutchison et al. ......... 370/506 |
| 5,598,442 A | | 1/1997 | Gregg et al. |
| 5,861,825 A | * | 1/1999 | Ino ........................... 341/50 |
| 6,201,829 B1 | * | 3/2001 | Schneider ................. 375/221 |
| 6,233,073 B1 | * | 5/2001 | Bowers et al. ............ 398/16 |
| 6,362,757 B1 | * | 3/2002 | Lee et al. .................. 341/102 |

OTHER PUBLICATIONS

Stugrin, Michael, "Conexant Works with Cisco to Define Interconnection Standard that Cuts Costs of Depolying High–Speed Wide Area Networks," Internet, Conexant, No. 1, p. two, (Nov. 10, 1999).

Nowell, Mark, "Proposal for a very Short Reach (VSR) OC–192/STM–64 Interface Based on Parallel Optics," Working Group: Physical and Link Layer (PLL), pp. ten, (Oct. 19–20, 1999 OIF meeting, Los Angeles).

* cited by examiner

Primary Examiner—Temesghen Ghebretinsae
Assistant Examiner—Qutub Ghulamali
(74) Attorney, Agent, or Firm—Keith Kind (57) ABSTRACT

A data communication circuit includes a decoder and an alignment buffer. The decoder receives and decodes parallel (N) bit channels into parallel (M+X) bit channels with signaling bits that indicate headers in the parallel (M+X) bit channels. The decoder transfers the parallel (M+X) bit channels to the alignment buffer. The alignment buffer recovers and aligns parallel (M) bit channels using the signaling bits. The alignment buffer generates a clock selection signal using the signaling bits. The alignment buffer transfers the aligned parallel (M) bit channels and the clock selection signal. The alignment buffer can have a length that is a multiple of a frame length for the (M) bit parallel channels.

46 Claims, 6 Drawing Sheets

ALIGNMENT OF PARALLEL DATA CHANNELS USING HEADER DETECTION SIGNALING

BACKGROUND OF THE INVENTION

1. Field of the Invention

The invention is related to the field of data communication, and in particular, to a data communication circuit that uses header detection signaling bits to align parallel data channels.

2. Statement of the Problem

Data communication systems transfer user data from one point to another. The user data is often transferred in packets that have headers. The headers carry address information that is used to identify and route the packets. The packets are transferred over channels that are arranged in parallel to provide simultaneous transmission of multiple packets. It is important to synchronize the parallel channels to a common clock so the system receiving the parallel channels can effectively detect and multiplex the user data.

One solution for synchronizing parallel channels uses circuitry to detect and align no the headers in the packets. The alignment of the headers also aligns the parallel channels. Unfortunately, the circuitry periodically mis-interprets the user data as a header and mistakenly aligns this mis-interpreted user data with the headers in the other parallel channels. Thus, the circuitry that is supposed to align the parallel channels actually mis-aligns the channels. Channel mis-alignment prevents the effective detection and multi-plexing of the user data. The problem is further illustrated below with respect to FIG. 1.

SUMMARY OF THE SOLUTION

The invention solves the problem with a data communication circuit that has improved channel alignment and clocking. The data communication circuit generates signaling bits that indicate headers to the alignment buffer. The alignment uses the signaling bits to align the parallel channels instead of having to detect the headers. As a result, the alignment buffer is prevented from detecting false headers in the user data and mis-aligning the parallel channels.

The data communication circuit includes a decoder and an alignment buffer. The decoder receives and decodes parallel (N) bit channels into parallel (M+X) bit channels where the variables N, M, and X are integers. The (M+X) bit channels include signaling bits that indicate headers in the parallel (M+X) bit channels. The decoder transfers the parallel (M+X) bit channels to the alignment buffer. The alignment buffer recovers and aligns parallel (M) bit channels using the signaling bits. The alignment buffer also generates a clock selection signal using the signaling bits. The alignment buffer transfers the aligned parallel (M) bit channels and the clock selection signal. The alignment buffer can have a length that is a multiple of a frame length for the (M) bit parallel channels.

DETAILED DESCRIPTION

Figure 1:
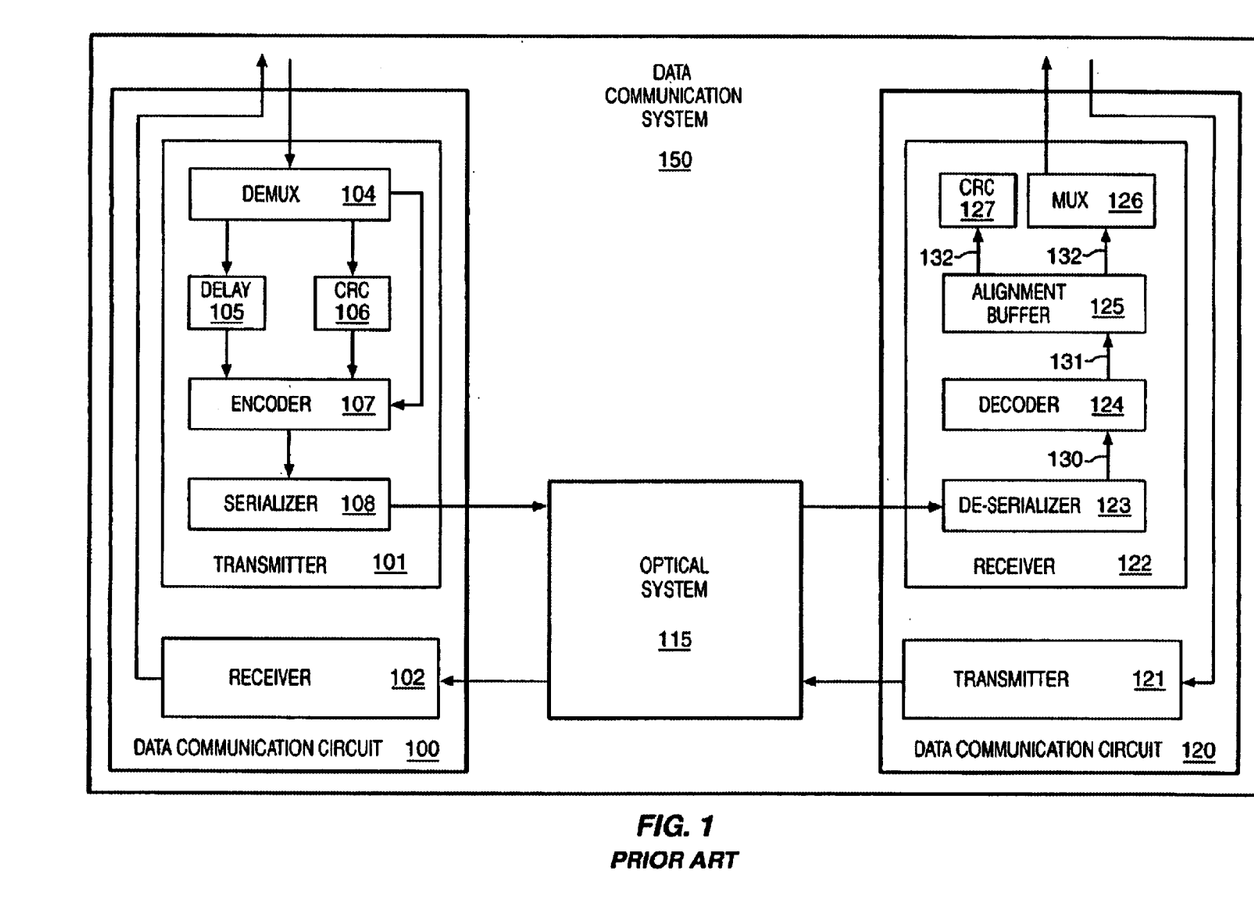
FIG. 1 illustrates a data communication system in the prior art.

Prior Art Data Communication System—FIG. 1

FIG. 1 illustrates a data communication system 150 in the prior art. The data communication system 150 includes a data communication circuit 100 coupled to another data communication circuit 120 by an optical communication system 115. The data communication circuit 100 includes a transmitter 101 and a receiver 102. The data communication circuit 120 includes a transmitter 121 and a receiver 122. The receiver 102 is configured and operates like the receiver 122. The transmitter 121 is configured and operates like the transmitter 101. The transmitter 101 includes a demux 104, delay 105, Cyclic Redundancy Check (CRC) 106, encoder 107, and serializer 108. The receiver 122 includes a de-serializer 123, decoder 124, alignment buffer 125, mux 126, and CRC 127.

The data communication system 150 is configured to operate as follows. The demux 104 receives and processes an optical OC-192 signal. The demux 104 includes error correction logic to calculate parity. The demux 104 transfers eleven parallel channels to both the delay 105 and the CRC 106. These parallel channels include ten 8-bit data channels and one 8-bit parity channel. The demux 104 also includes a framer that transfers a control signal to the encoder 107 indicating the start of headers in the parallel channels.

The CRC 106 performs CRC calculations for the eleven parallel channels and transfers a resulting CRC channel to the encoder 107. The delay 105 introduces a delay into the eleven parallel channels to allow time for the CRC calculations. The delay 105 transfers the eleven delayed parallel channels to the encoder 107.

The encoder 107 receives the control signal and twelve 8-bit parallel channels. The twelve 8-bit parallel channels are comprised of 10 data channels, one parity channel, and one CRC channel. The encoder 107 converts the twelve 8-bit parallel channels into twelve corresponding 10-bit parallel channels. The conversion encodes clocking into the 10-bit parallel channels and removes bias. The encoder 107 also inserts a control character, such as a comma, to delimit each header in response to the control signal from the demux 104. The encoder 107 transfers the twelve 10-bit parallel channels to the serializer 108.

The serializer 108 converts the twelve 10-bit parallel channels into twelve 1-bit parallel channels. The serializer 108 transfers the twelve 1-bit parallel channels to the optical system 115. The optical system 115 converts the twelve 1-bit channels from electrical to optical and transfers the optical signals toward the data communications circuit 120. Before transfer to the data communication circuit 120, the optical system 115 re-converts the optical signals from optical to electrical and recovers clocking. The optical system 115 transfers twelve 1-bit parallel channels, including twelve recovered clocks, to the de-serializer 123.

The de-serializer 123 converts the twelve 1-bit channels into twelve 10-bit parallel channels 130. The twelve 10-bit parallel channels 130 are comprised of ten data channels, one parity channel, and one CRC channel. The de-serializer 123 transfers the twelve 10-bit channels 130 to the decoder 124.

The decoder 124 converts the twelve 10-bit channels 130 into twelve corresponding 8-bit channels 131. The decoder 124 transfers the twelve 8-bit channels 131 to the alignment buffer 125. The alignment buffer 125 aligns the 8-bit parallel channels 131 in memory by detecting the headers in the twelve 8-bit channels 131. The alignment buffer 125 transfers the aligned 8-bit parallel channels 132 to the mux 126 and the CRC 127.

The mux 126 converts the aligned 8-bit parallel channels 132 into a corresponding OC-192 signal. The mux 126 transfers the OC-192 signal. The mux 126 includes a protection switch and a polarity switch. The mux 126 also includes error correction logic to process the parity channel to detect errors and control the polarity switch. The CRC 127 performs CRC validation for the aligned 8-bit parallel channels 132.

Unfortunately, the alignment buffer 125 may confuse actual user data with the header. The confusion causes false header detection in the alignment buffer 125 that results in channel misalignment and faulty clocking. The mux 126 and the CRC 127 are unable to effectively process the parallel channels 132 if channel misalignment or faulty clocking are present. Thus, the data communication system 150 fails to effectively transfer the user data.

Figure 2:
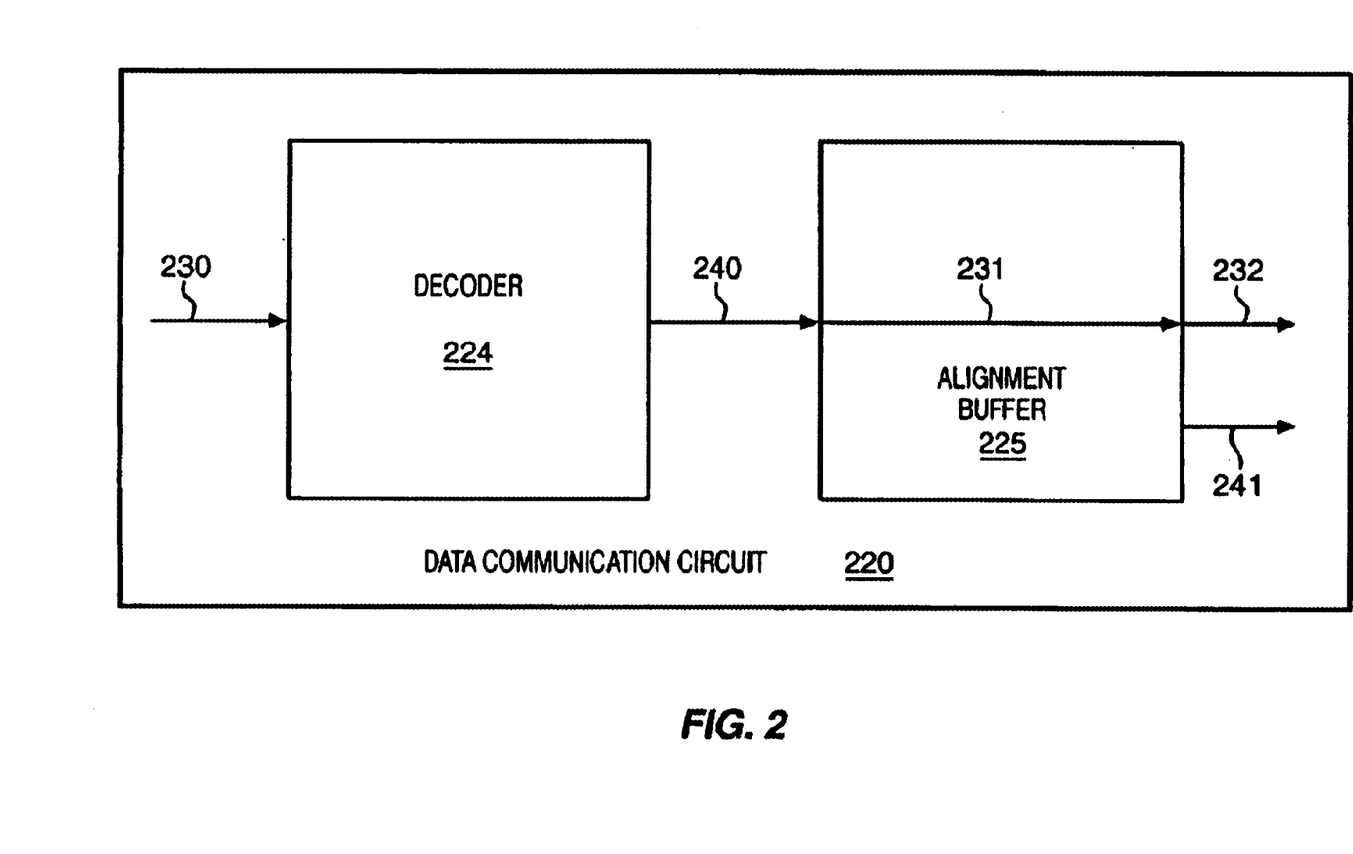
FIG. 2 illustrates a data communication circuit in an example of the invention.

Data Communication Circuit Configuration and Operation—FIG. 2

FIG. 2 illustrates a specific example of a data communication circuit in accord with the present invention. Those skilled in the art will appreciate numerous variations from this example that do not depart from the scope of the invention. Those skilled in the art will also appreciate that various features described below could be combined to form multiple variations of the invention.

FIG. 2 illustrates a data communication circuit 220 in an example of the invention. The data communication circuit 220 includes a decoder 224 coupled to an alignment buffer 225. The following variables (N), (M), and (X) represent integers. The decoder 224 and alignment buffer 225 are configured to operate as follows.

The decoder receives and decodes parallel (N) bit channels 230 into parallel (M+X) bit channels 240 that include signaling bits that indicate headers in the parallel (M+X) bit channels 240. The decoder transfers the parallel (M+X) bit channels 240 to the alignment buffer 225. The alignment buffer 225 recovers parallel (M) bit channels 231 and the signaling bits from the parallel (M+X) bit channels 240. The alignment buffer 225 aligns the parallel (M) bit channels 231 using the signaling bits.

The data communication circuit 220 has multiple clocks. The alignment buffer 225 uses the signaling bits to generate a clock selection signal 241 that identifies one of these clocks that is functioning properly. Other components use the properly functioning clock in response to the clock selection signal 241. The alignment buffer 225 transfers the aligned parallel (M) bit channels 232 and the clock selection signal 241.

In some examples of the invention, the alignment buffer 225 has a length that is a multiple of a frame length for the (M) bit parallel channels 231. This buffer length has a wrap-around effect that causes the alignment buffer 225 to write headers at repeating addresses. Repeating header addresses reduce the complexity of the buffer logic.

Advantageously, the data communication circuit 220 has improved channel alignment and clocking. The alignment buffer 225 uses the signaling bits for channel alignment and clocking instead of trying to detect headers in the user data. As a result, the alignment buffer 225 is prevented from detecting false headers in the user data. Thus, the signaling bits avoid the misaligned channels and faulty clocking caused by false header detection.

Figure 3:
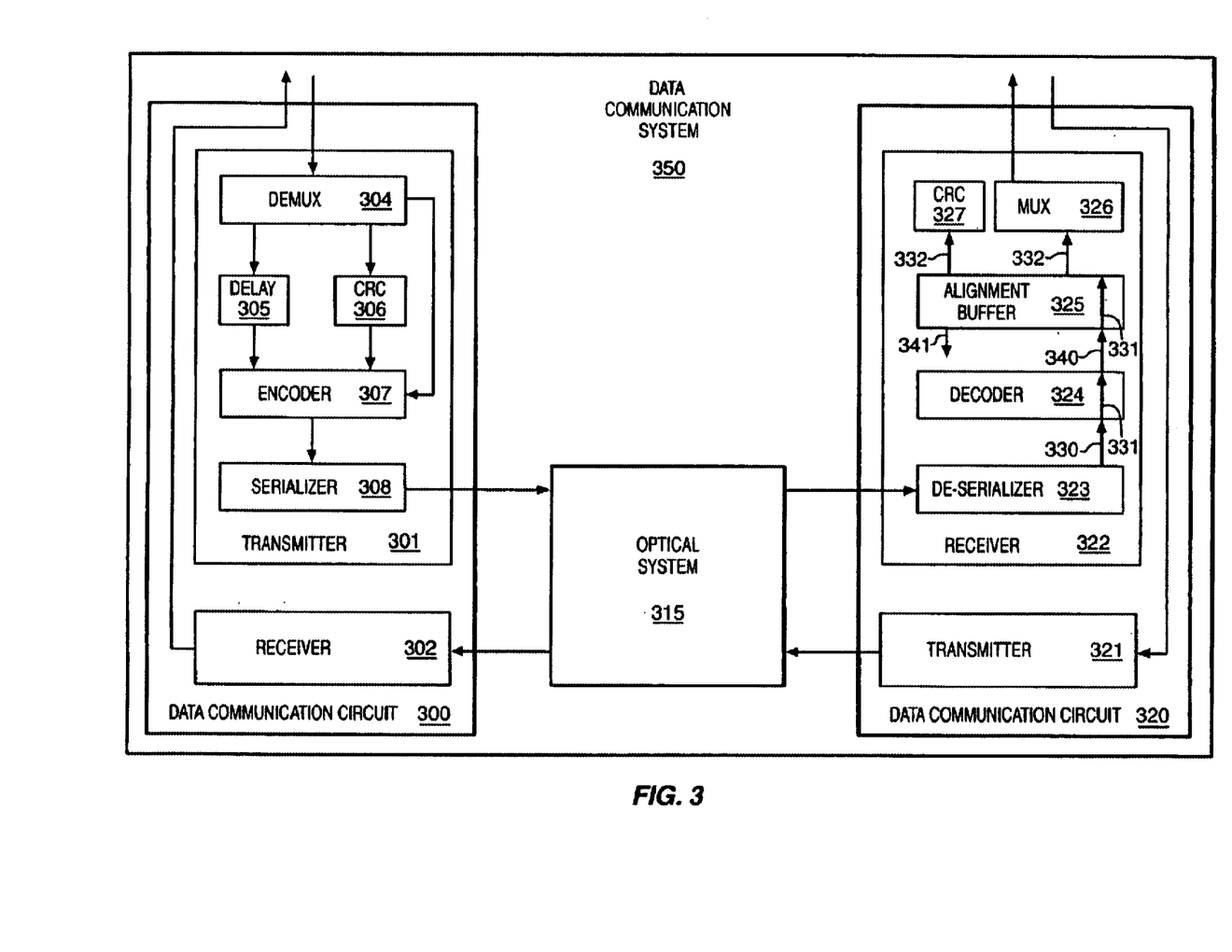
FIG. 3 illustrates a data communication system in an example of the invention.
Figure 4:
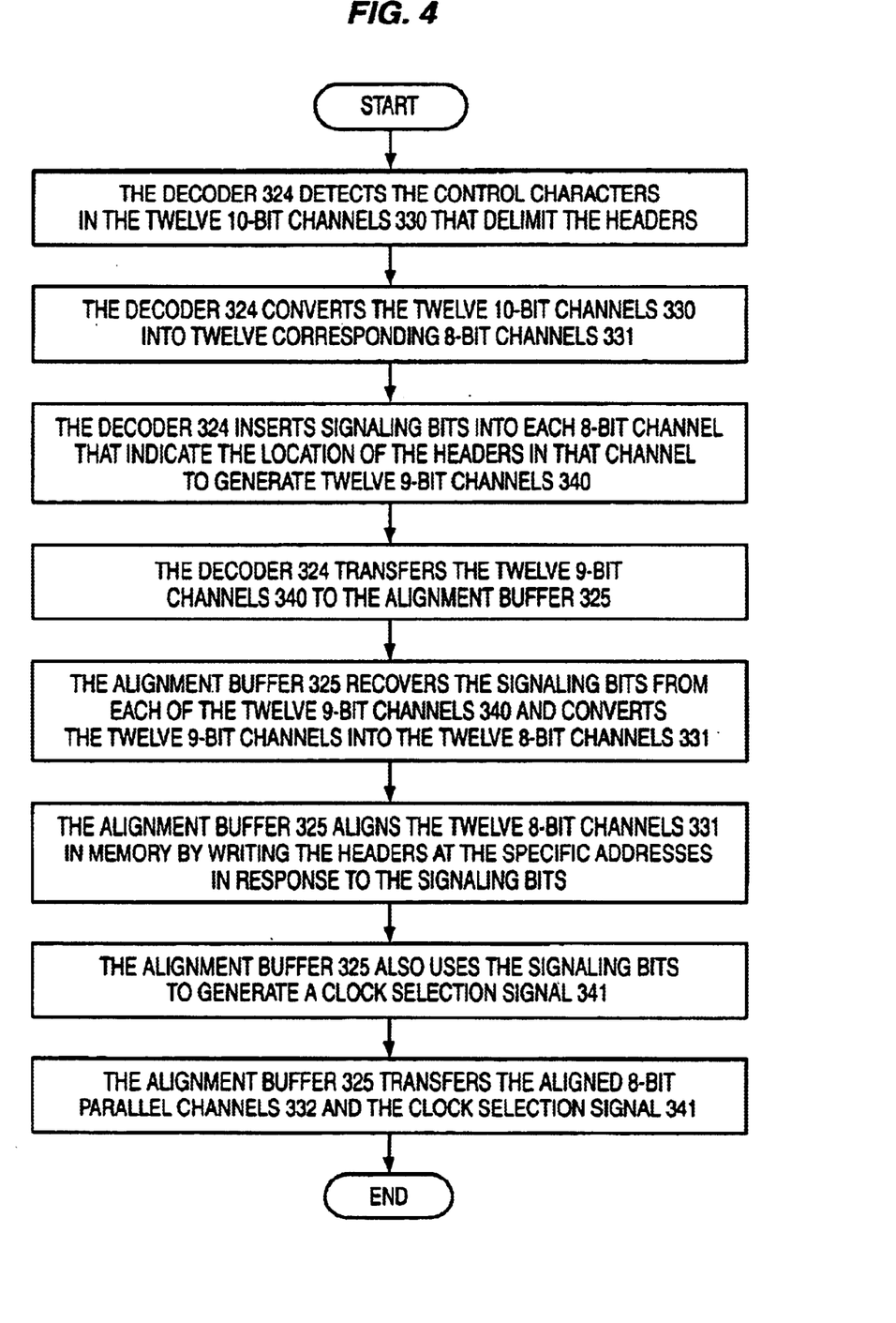
FIG. 4 illustrates the operation of a decoder and alignment buffer in an example of the invention.

8b/10b Data Communication System Configuration and Operation—FIGS. 3–4

FIGS. 3–4 illustrate a specific example of a data communication system in accord with the present invention. Those skilled in the art will appreciate numerous variations from this example that do not depart from the scope of the invention. Those skilled in the art will also appreciate that various features described below could be combined with the above-described embodiment to form multiple variations of the invention.

FIG. 3 illustrates a data communication system 350 in an example of the invention. Those skilled in the art will appreciate that some conventional aspects of the data communication system 350 have been omitted for clarity. The data communication system 350 includes a data communication circuit 300 coupled to a data communication circuit 320 by an optical communication system 315. The data communication circuit 300 includes a transmitter 301 and a receiver 302. The data communication circuit 320 includes a transmitter 321 and a receiver 322. The receiver 302 is configured and operates like the receiver 322. The transmitter 321 is configured and operates like the transmitter 301. The transmitter 301 includes a demux 304, delay 305, CRC 306, encoder 307, and serializer 308. The receiver 322 includes a de-serializer 323, decoder 324, alignment buffer 325, mux 326, and CRC 327. Aside from the decoder 324 and the alignment buffer 325, the configuration and operation of these components and systems could be conventional.

The data communication system 350 is configured to operate as follows. The demux 304 receives and processes an OC-192 signal. The demux 304 includes error correction logic to calculate parity. The demux 304 transfers eleven parallel channels to both the delay 305 and the CRC 306. These parallel channels include ten 8-bit data channels and one 8-bit parity channel. The demux 304 also includes a framer that transfers a control signal to the encoder 307 indicating the start of headers in the parallel channels.

The CRC 306 performs CRC calculations for the eleven parallel channels and transfers a resulting CRC channel to the encoder 307. The delay 305 introduces a delay into the eleven parallel channels to allow time for the CRC calculations. The delay 305 transfers the eleven delayed parallel channels to the encoder 307.

The encoder 307 receives the control signal and twelve 8-bit parallel channels. The twelve 8-bit parallel channels are comprised of 10 data channels, one parity channel, and one CRC channel. The encoder 307 converts the twelve 8-bit parallel channels into twelve corresponding 10-bit parallel channels. The conversion encodes clocking into the 10-bit parallel channels and removes bias. The encoder 307 also inserts a control character, such as a comma, to delimit each header in response to the control signal from the demux 304. The encoder 307 transfers the twelve 10-bit parallel channels to the serializer 308.

The serializer 308 converts the twelve 10-bit parallel channels into twelve 1-bit parallel channels. The serializer 308 transfers the twelve 1-bit parallel channels to the optical system 315. The optical system 315 converts the twelve 1-bit channels from electrical to optical and transfers the optical signals toward the data communications circuit 320. Before transfer to the data communication circuit 320, the optical system 315 re-converts the optical signals from optical to electrical and recovers clocking. If desired, the clock data recovery circuitry that recovers the clocking could be integrated into the data communication circuit 320. The optical system 315 transfers twelve 1-bit parallel channels, including twelve recovered clocks, to the de-serializer 323.

The de-serializer 323 converts the twelve 1-bit channels into twelve 10-bit parallel channels 330. The twelve 10-bit parallel channels 330 are comprised of ten data channels, one parity channel, and one CRC channel. The de-serializer 323 transfers the twelve 10-bit channels 330 to the decoder 324.

FIG. 4 depicts the operation of the decoder 324 and the alignment buffer 325 in an example of the invention. With respect to FIGS. 3–4, the decoder 324 detects the control characters in the twelve 10-bit channels 330 that delimit the headers. The decoder 324 converts the twelve 10-bit channels 330 into twelve corresponding 8-bit channels 331. Based on the control character detection, the decoder 324 generates signaling bits for each of the 8-bit channels 331 that indicate the location of the headers in each 8-bit channel. The decoder 324 inserts the signaling bits into the twelve 8-bit channels 331 to generate twelve 9-bit channels 340. The signaling bits are controlled so each channel includes signaling bits that indicate the start of headers in that channel. The decoder 324 transfers the twelve 9-bit channels 340 to the alignment buffer 325.

The alignment buffer 325 recovers the signaling bits from each of the twelve 9-bit channels 340. The alignment buffer 325 converts the twelve 9-bit channels into the twelve 8-bit channels 331. The alignment buffer 325 writes the twelve 8-bit channels 331 to internal memory space. To align the 8-bit parallel channels 331 in memory, the alignment buffer 325 begins writing the 8-bit parallel channels 331 to specific addresses when the signaling bits indicate a header is present. Thus, the headers are aligned at the specific addresses.

The alignment buffer 325 has a length that is a multiple of the frame length for the 8-bit bit parallel channels 331. This buffer length creates a wrap-around effect that causes the alignment buffer 325 to write headers at repeating addresses. A repeating header address is typically located at the beginning of the memory space and reduces the complexity of the buffer logic. The alignment buffer 325 transfers the aligned 8-bit parallel channels 332 to the mux 326 and the CRC 327.

The alignment buffer 325 also uses the signaling bits to generate a clock selection signal 341. The timing skew across channels is 100 nanoseconds so the clock, which is derived from one channel, will provide accurate timing for the other parallel channels. If the channel used for the clock malfunctions, then the alignment buffer 325 changes the clock selection signal 341 to identify a clock from a properly functioning channel. The alignment buffer 325 transfers clock selection signal 341 to clock selection circuitry (not shown).

The mux 326 converts the aligned 8-bit parallel channels 332 into a corresponding OC-192 signal. The mux 326 transfers the OC-192 signal. The mux 326 includes a protection switch and a polarity switch. The mux 326 also includes error correction logic to process the parity channel to detect errors and control the polarity switch. The CRC 327 performs CRC validation for the aligned 8-bit parallel channels 332.

Figure 5:
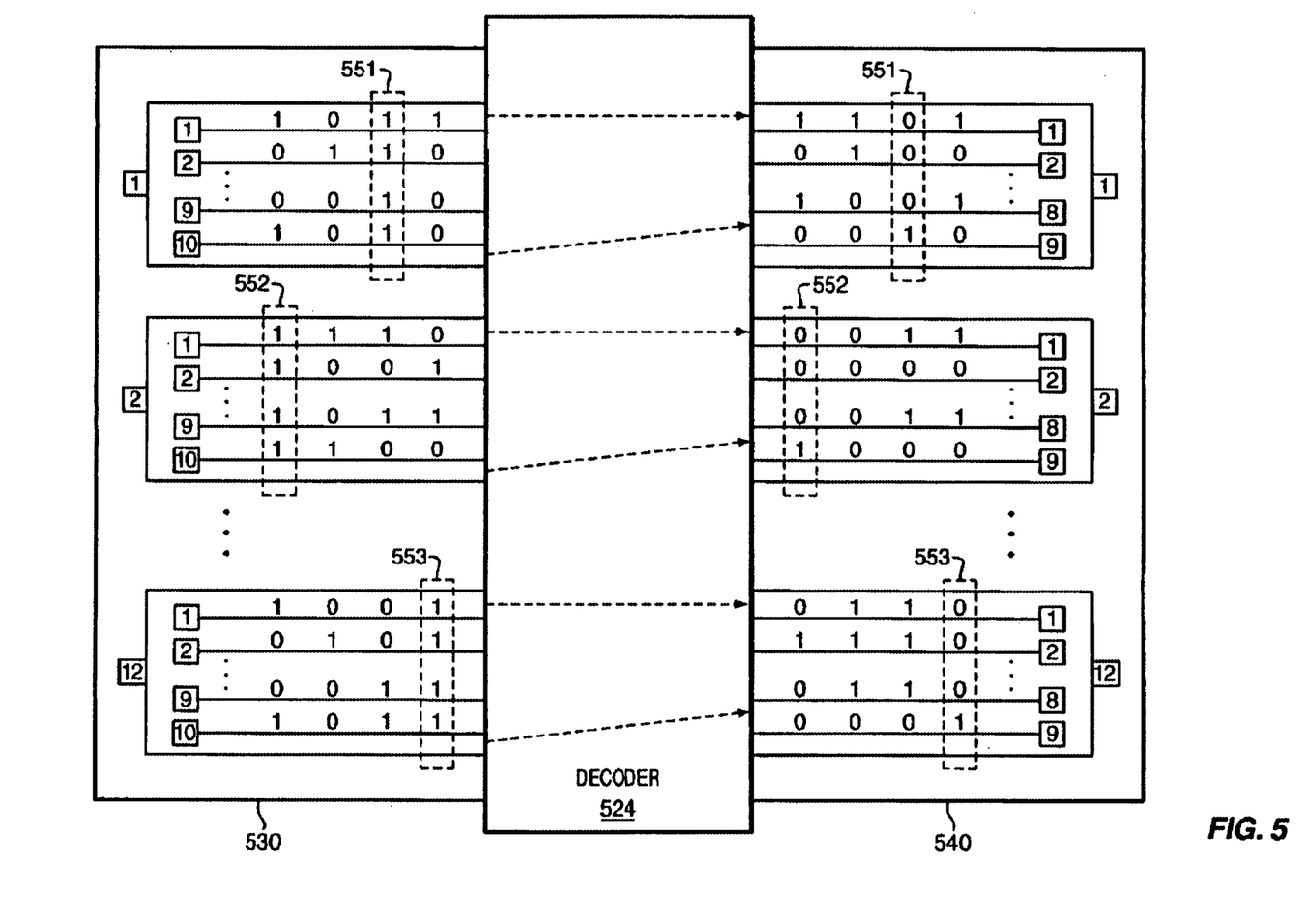
FIG. 5 illustrates the operation of a decoder in an example of the invention.
Figure 6:
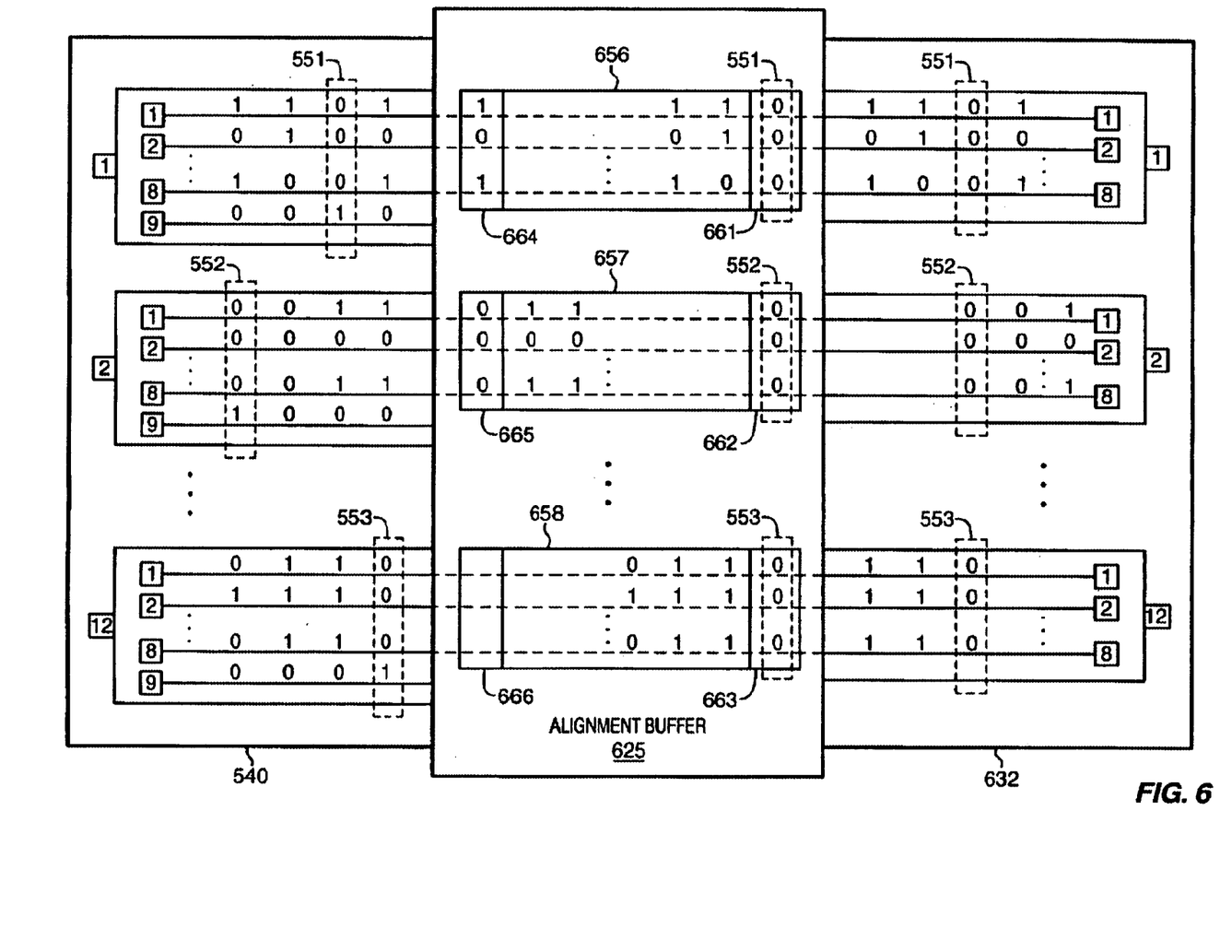
FIG. 6 illustrates the operation of an alignment buffer in an example of the invention.

The Decoder and Alignment Buffer—FIGS. 5–6

FIGS. 5–6 illustrate a specific example of a decoder and alignment buffer in accord with the present invention. Those skilled in the art will appreciate numerous variations from this example that do not depart from the scope of the invention. Those skilled in the art will also appreciate that various features described below could be combined with the above-described embodiments to form multiple variations of the invention.

FIG. 5 illustrates the operation of a decoder 524 in an example of the invention. The decoder receives twelve 10-bit parallel channels 530. The channel and bit designations are indicated in boxes at the left, and for clarity, all of the channels and bits are not shown. The first channel includes a control character 551 at the start of a header. For clarity, the control character 551 is represented by all "1" bits, but typically, the control character is the bit pattern of a comma character. The second and twelfth channels respectively include control characters 552 and 553 at the start of headers. Note that the control characters 551–553 and associated headers and channels are not aligned.

The right side of FIG. 5 depicts the same information from the twelve 10-bit parallel channels 530 after processing by the decoder 524 to generate the resulting twelve 9-bit parallel channels 540. The decoder 524 decodes the 10-bit channels 530 into the first 8 bits of the 9-bit channels 540 to remove the encoding of the transmitter 301. Note that decoding converts the control characters 551–553 from all "1"s to all "0"s and changes other bits as well. The decoder 524 adds a ninth bit to the 9-bit channels 540 to identify the position of the control characters 551–553. A "1" bit is placed in the ninth bit of each channel at the same position as the control character in that channel. Otherwise, the ninth bit is a "0". Note that the control characters 551–553 and associated headers and channels are still not aligned.

FIG. 6 depicts the operation of the alignment buffer 625 in an example of the invention. For the first channel, the alignment buffer 625 includes memory space that has a first address 661 and a last address 664. The second and twelfth channels also have their respective first addresses 662–663 and last addresses 665–666.

The alignment buffer 625 receives the twelve 9-bit channels 540 from the decoder 524 of FIG. 5. When the alignment buffer detects a "1" in the ninth bit of one of the 9-bit channels 540, it starts writing data from that channel to the first address in the memory space for that channel. This technique aligns the start of the headers for all of the parallel channels at the first addresses 661–663. Since the alignment buffer has a length that is a multiple of the frame length, the last bits before the header occupy the last addresses 664–666.

Note that in the second channel, the bits 1–8 before the control character 552 are also all "0"s just like a decoded control character. If the alignment buffer 625 were looking at the bits 1–8, it might misinterpret these "0"s as the control character 552 and misalign the channels. Instead, the alignment buffer 625 looks at the ninth bit which has a "1" identifying the control character 552, but a "0" everywhere else. Thus, the header signaling in the ninth bit avoids false header detection.

When the alignment buffer 625 receives a "1" in the ninth bit for all of the 9-bit parallel channels 540, it begins to read the channels at the first addresses 661–663 in the memory space to generate the 8-bit parallel channels 632. Note that the control characters 551–553 and the associated headers and channels are now aligned.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A data communication circuit comprising:
   a decoder configured to receive parallel (N) bit channels, detect characters in the (N) bit parallel channels that delimit headers in the (N) bit parallel channels, decode the (N) bit parallel channels into parallel (M+X) bit channels with signaling bits that indicate the headers, control the signaling bits for corresponding ones of the (M+X) bit parallel channels to indicate the headers, and transfer the parallel (M+X) bit channels; and an alignment buffer coupled to the decoder and configured to receive the parallel (M+X) bit channels, recover and align parallel (M) bit channels using the signaling bits, generate a clock selection signal using the signaling bits, and transfer the parallel (M) bit channels and the clock selection signal.

2. The data communication circuit of claim 1 wherein the alignment buffer is configured to begin writing the corresponding ones of the (M) bit parallel channels to specified addresses in response to the signaling bits for the corresponding ones of the (M+X) bit parallel channels indicating the headers.

3. The data communication circuit of claim 1 wherein (N)=10, (M)=8, and (X)=1.

4. The data communication circuit of claim 3 wherein the parallel 8-bit channels are encoded into the parallel 10-bit channels to carry clock information and remove bias.

5. The data communication circuit of claim 4 wherein the decoder is configured to receive and decode 12 10-bit channels into 12 8-bit channels.

6. The data communication circuit of claim 1 wherein the parallel channels include a parity channel.

7. The data communication circuit of claim 1 wherein the parallel channels include a cyclic redundancy check channel.

8. The data communication circuit of claim 1 further comprising a de-serializer coupled to the decoder.

9. The data communication circuit of claim 1 further comprising a byte mux and a protection switch coupled to the alignment buffer.

10. The data communication circuit of claim 1 further comprising an encoder configured to receive other (M) bit parallel channels, encode the other (M) bit parallel channels into other (N) bit parallel channels, and transfer the other (N) bit parallel channels.

11. The data communication circuit of claim 10 wherein the other parallel channels include a parity channel.

12. The data communication circuit of claim 10 wherein the other parallel channels include a cyclic redundancy check channel.

13. The data communication circuit of claim 10 further comprising a serializer coupled to the encoder.

14. A data communication circuit comprising:
a decoder configured to receive and decode parallel (N) bit channels into parallel (M+X) bit channels with signaling bits that indicate headers in the parallel (M+X) bit channels, and transfer the parallel (M+X) bit channels; and
an alignment buffer coupled to the decoder and configured to receive the parallel (M+X) bit channels, recover and align parallel (M) bit channels using the signaling bits wherein the alignment buffer is configured with a length that is a multiple of a frame length for the (M) bit parallel channels, generate a clock selection signal using the signaling bits, and transfer the parallel (M) bit channels and the clock selection signal.

15. The data communication circuit of claim 14 wherein the decoder is configured to detect characters in the (N) bit parallel channels that delimit headers and control the signaling bits for corresponding ones of the (M+X) bit parallel channels to indicate the headers.

16. The data communication circuit of claim 15 wherein the alignment buffer is configured to begin writing the corresponding ones of the (M) bit parallel channels to specified addresses in response to the signaling bits for the corresponding ones of the (M+X) bit parallel channels indicating the headers.

17. The data communication circuit of claim 14 wherein (N)=10, (M)=8, and (X)=1.

18. The data communication circuit of claim 17 wherein the parallel 8-bit channels are encoded into the parallel 10-bit channels to carry clock information and remove bias.

19. The data communication circuit of claim 18 wherein the decoder is configured to receive and decode 12 10-bit channels into 12 8-bit channels.

20. The data communication circuit of claim 14 wherein the parallel channels include a parity channel.

21. The data communication circuit of claim 14 wherein the parallel channels include a cyclic redundancy check channel.

22. The data communication circuit of claim 14 further comprising a de-serializer coupled to the decoder.

23. The data communication circuit of claim 14 further comprising a byte mux and a protection switch coupled to the alignment buffer.

24. The data communication circuit of claim 14 further comprising an encoder configured to receive other (M) bit parallel channels, encode the other (M) bit parallel channels into other (N) bit parallel channels, and transfer the other (N) bit parallel channels.

25. The data communication circuit of claim 24 wherein the other parallel channels include a parity channel.

26. The data communication circuit of claim 24 wherein the other parallel channels include a cyclic redundancy check channel.

27. The data communication circuit of claim 24 further comprising a serializer coupled to the encoder.

28. A method of operating a data communication circuit, the method comprising the steps of:
receiving parallel (N) bit channels;
detecting characters in the (N) bit parallel channels that delimit headers in the (N) bit parallel channels;
decoding the (to bit parallel channels into parallel (M+X) bit channels that include signaling bits indicating the headers;
controlling the signaling bits for corresponding ones of the (M+X) bit parallel channels to indicate the headers;
recovering and aligning parallel (M) bit channels from the parallel (M+X) bit channels using the signaling bits;
generating a clock selection signal using the signaling bits; and
transferring the parallel (M) bit channels and the clock selection signal.

29. The method of claim 28 wherein aligning parallel (M) bit channels comprises writing the corresponding ones of the (M) bit parallel channels to specified addresses in response to the signaling bits for the corresponding ones of the (M+X) bit parallel channels indicating the headers.

30. The method of claim 28 wherein (N)=10, (M)=8, and (X)=1.

31. The method of claim 30 wherein the parallel 8-bit channels are encoded into the parallel 10-bit channels to carry clock information and remove bias.

32. The method of claim 31 wherein decoding the parallel 10 bit channels comprises decoding twelve 10-bit channels into twelve 8-bit channels.

33. The method of claim 28 further comprising performing a parity check for the parallel channels.

34. The method of claim 28 further comprising performing a cyclic redundancy check for the parallel channels.

35. The method of claim 28 further comprising a de-serializing the (N) bit parallel channels.

36. The method of claim 28 further comprising encoding other (M) bit parallel channels into other (N) bit parallel channels and transferring the other (N) bit parallel channels.

37. A method of operating a data communication circuit, the method comprising the steps of:

receiving and decoding parallel (N) bit channels into parallel (M+X) bit channels tat include signaling bits indicating headers in the parallel (M+X) bit channels;

recovering and aligning parallel (M) bit channels from the parallel (M+X) bit channels using the signaling bits in an alignment buffer that is configured with a length that is a multiple of a frame length for the (M) bit parallel channels;

generating a clock selection signal using the signaling bits; and transferring the parallel (M) bit channels and the clock selection signal.

38. The method of claim 37 wherein decoding the parallel (N) bit channels into the parallel (M+X) bit channels that include the signaling bits comprises detecting characters in the (N) bit parallel channels that delimit the headers and controlling the signaling bits for corresponding ones of the (M+X) bit parallel channels to indicate the headers.

39. The method of claim 38 wherein aligning parallel (M) bit channels comprises writing the corresponding ones of the (M) bit parallel channels to specified addresses in response to the signaling bits for the corresponding ones of the (M+X) bit parallel channels indicating the headers.

40. The method of claim 37 wherein (N)=10, (N)=8, and (X)=1.

41. The method of claim 40 wherein the parallel 8-bit channels are encoded into the parallel 10-bit channels to carry clock information and remove bias.

42. The method of claim 41 wherein receiving and decoding the parallel 10 bit channels comprises receiving and decoding twelve 10-bit channels into twelve 8-bit channels.

43. The method of claim 37 further comprising performing a parity check for the parallel channels.

44. The method of claim 37 further comprising performing a cyclic redundancy check for the parallel channels.

45. The method of claim 37 further comprising de-serializing the (N) bit parallel channels.

46. The method of claim 37 further comprising encoding other (M) bit parallel channels into other (N) bit parallel channels and transferring the other (N) bit parallel channels.

* * * * *